United States Patent [19]

Hunter et al.

[11] Patent Number: 4,883,032

[45] Date of Patent: Nov. 28, 1989

[54] IN-CYLINDER CONTROL OF PARTICULATES AND NITRIC OXIDE FOR DIESEL ENGINE

[75] Inventors: Charles E. Hunter, Belleville; Harry A. Cikanek, Northville, both of Mich.

[73] Assignee: Ford Motor Company, Dearborn, Mich.

[21] Appl. No.: 299,853

[22] Filed: Jan. 23, 1989

[51] Int. Cl.⁴ .............................................. F02B 3/00
[52] U.S. Cl. .................................................. 123/276
[58] Field of Search ............... 123/276, 279, 301, 302, 123/661

[56] References Cited

U.S. PATENT DOCUMENTS

| | | | |
|---|---|---|---|
| 4,676,210 | 1/1987 | Moser et al. | 123/301 |
| 4,771,748 | 9/1988 | Chinnela et al. | 123/276 |
| 4,811,708 | 3/1989 | Gruden | 123/299 |

OTHER PUBLICATIONS

Cartellieri and Wachter, "Status Report On A Preliminary Survey Of Strategies To Meet U.S.-1991 HD Diesel Emissions Standards Without Exhaust Gas After-Treatment", SAE Technical Paper Series No. 870342, Feb. 1987.

Wade et al., "Reduction of $NO_x$ and Particulate Emissions In The Diesel Combustion Process", Journal of Engineering For Gas Turbines and Power, vol. 109, p. 426-433, Oct. 1987.

Primary Examiner—Raymond A. Nelli
Attorney, Agent, or Firm—Joseph W. Malleck; Roger L. May

[57] ABSTRACT

A method using concurrently and simultaneously certain control factors for in-cylinder combustion, at least two of such factors being at levels never tried before by the prior art. The combination of control factors comprises: (i) high pressure charging of supply air for enhanced excess oxygen; (ii) advanced techniques for improved in-cylinder mixing of fuel and air (i.e., high swirl, reentraining piston bowl configuration, high compression ratio); (iii) high pressure injection of diesel fuel at levels of $16-22 \times 10^3$ psi; (iv) smaller fuel nozzle ports for creating finer droplet size; (v) retardation of fuel injection from TDC by 2°-5°; and (vi) limitation of the ingress of lubrication oil into the combustion chamber by use of noncompressed cylinder sleeves to enhance piston to bore concentricity and preferably by other augmenting limits.

12 Claims, 8 Drawing Sheets

IN-CYLINDER CONTROL OF PARTICULATES AND NITRIC OXIDE FOR DIESEL ENGINE

BACKGROUND OF THE INVENTION

1. Technical Field

This invention relates to the art of reducing or eliminating particulates and nitric oxide emitted from a diesel engine and, more particularly, to technology for direct-injected diesel engines that aims to reduce the emission of $NO_x$ to less than 5 gm/hp-hr and particulates to less than 0.09 gm/hp-hr without exhaust gas after-treatment.

2. Description of Prior Art

The U S. Federal Government has set new standards for emissions from heavy duty diesel engines which will take effect in 1991. Generally, engines having cylinder bore diameters of 95-125 mm are used in trucks covered by such standards. Currently known technology cannot attain such standards for such engines without some form of after-treatment device. An after-treatment device allows the particulates to be trapped by filtering, collected, and periodically oxidized to regenerate the filter. Such devices, at best, are expensive and promote unwanted exhaust back pressure in the system.

Several investigations have been undertaken to isolate the factors which affect the generation (or assist in the reduction of generation) of particulates and nitric oxide. Such studies demonstrate that efforts to reduce $NO_x$ concurrently cause an increase in particulate emissions, and efforts to reduce particulates concurrently cause an increase in $NO_x$ (see Cartellieri and Wachter, "Status Report On A Preliminary Survey Of Strategies To Meet U.S.-1991 HD Diesel Emissions Standards Without Exhaust Gas After-Treatment", SAE Technical Paper Series No. 870342, February 1987; and Wade et al,"Reduction of $NO_x$ and Particulate Emissions In The Diesel Combustion Process", *Journal of Engineering For Gas Turbines And Power.* Vol. 109, p. 426-433, October, 1987). This interaction makes simultaneous control of both pollutants a difficult task. The Cartellieri paper identifies some factors having potential to simultaneously reduce both pollutants, but failed to say how such factors were to be carried out in practice to achieve such result and the degree to which the combustion process needed to be modified. Thus, the identification of such factors without further practical testing leads one to indefinite conclusions and does not offer a usable solution without further experimentation.

In the Wade et al paper, it was recognized that a leaner air/fuel ratio in the premix zone and in the diffusion zone would be necessary to obtain a simultaneous reduction of the pollutants, but the paper failed to suggest "how" to achieve such leaner air/fuel ratios in such locations, while admonishing that it would be very difficult to achieve practically. Variations in the use of air pressure boosting and fuel injection were modeled, but validation of the model with experimental data was limited to ranges that gave inconclusive and contradictory hopes. The predicted hopes were plotted as separate and independent advances; in reality, to obtain leaner air/fuel mixtures in the premix zone (where $NO_x$ is primarily generated) or diffusion zone (where particulates are primarily generated), such factors must be carried out simultaneously. The knowledge, to date, as represented in this paper, fails to show how to reduce the air/fuel mixture in both zones simultaneously without affecting the overall power of the engine.

Therefore, it is a primary object of this invention to simultaneously reduce both nitric oxide and particulates as a result of in-cylinder combustion by simultaneously (i) increasing the local air/fuel ratio in both the premix and diffusion zones of the combustion chamber, and (ii) reducing the ingress of lubricating oil into such combustion chamber by at least 40% without detrimentally affecting the power and durability characteristics of the engine.

A more particular object of this invention is to reduce the fraction of fuel burned in the premix zone of the combustion chamber, improving mixing of the diffusion zone combustion products with air, and thereby reduce particulates to or below 0.09 gm/bhp-hr or 0.44 gm/kg fuel and reducing $NO_x$ to or below 4.4 gm/bhp-hr or 21.6 gm/kg fuel.

SUMMARY OF THE INVENTION

To meet these objectives, the invention has discovered that concurrent and simultaneous use of certain control factors for in-cylinder combustion, at least two of such factors being at levels never tried before by the prior art, will succeed. The combination of control factors comprises: (i) high pressure charging of supply air for enhanced excess oxygen (ii) advanced techniques for improved in-cylinder mixing of fuel and air (i.e., high swirl, reentraining piston bowl configuration, high compression ratio); (iii) high pressure injection of diesel fuel at levels greater than $16 \times 10^3$ psi (preferably $18-22 \times 10^3$ psi); (iv) smaller fuel nozzle ports for creating finer droplet size; (v) retardation of fuel injection from TDC by 2°-5°; and (vi) limitation of the ingress of lubricating oil into the combustion chamber by use of noncompressed cylinder sleeves to enhance piston to bore concentricity and preferably by other augmenting limits.

In accordance with the above, the invention is a method of providing simultaneous and concurrent in-cylinder control of the formation of particulates and nitric oxide during the combustion cycle of direct-injected diesel fuel and pressure charged air in a combustion chamber of a heavy duty diesel engine, the combustion chamber being (i) defined in part by a piston crown separated from a supply of lubricating oil by piston rings and (ii) configured to accept advanced combustion techniques for introducing, distributing and compressing the fuel and air, comprising the steps of: (a) injecting said diesel fuel at a pressure equal to or greater than $16 \times 10^3$ psi and through injector nozzle ports having a diameter less than 0.18 mm; (b) retarding the start of fuel injection from TDC by 2°-5°; and (c) limiting ingress of lubricating oil into the combustion chamber by increasing the piston ring to cylinder bore concentricity through the use of noncompressed cylinder sleeves defining the cylinder bore.

Preferably, the air is turbocharged at a pressure of 46-55 inches of mercury and is intercooled to a temperature in the range of 110°-120° F.

Preferably, the fuel is injected by a unit injector pump placed immediately at the fuel nozzle location. Alternatively, the fuel is injected into all chambers by use of a common pressurized rail system which optimally is variably controlled. Advantageously, the diesel fuel contains a sulphur content limited to 0.05 weight percent and aromatics limited to 11.2 weight percent.

The method preferably employs accepted advanced techniques for improved mixing of fuel and air, comprising: (a) use of a reentraining piston bowl configuration in the crown of the piston; (b) use of an inlet for the air designed to promote high swirl; (c) a compression ratio greater than 18:1 (preferably 20:1 or higher).

Preferably, the ingress of lubricating oil is further limited by any of the following augmenting techniques: (i) honing the diameter of the cylinder sleeve to be accurate within a concentricity tolerance of ±0.0005 inches; (ii) eliminating any cylinder bores that have 4 or more node distortion after honing; (ii) increasing the piston ring tangential tension by 20–40%, acting against the cylinder sleeves, i.e., 400 radial psi to 480–560 radial psi; (iv) increasing the lubricating oil viscosity, at least one grade weight; and (v) using wet cylinder sleeves to control bore distortion resulting from thermal expansion.

SUMMARY OF THE DRAWINGS

FIGS. 8 (8a and 8b) shows bar graphs for the variation of premixed and diffusion combustion with different factor combinations, the bar graphs being respectively at different engine speeds and intake pressures; and.

DETAILED DESCRIPTION AND BEST MODE

The $NO_x$ and particulate emissions of conventional diesel engines, as used today, are significantly higher than the 1991 federal requirements. As changes are made to the conventional diesel engine to reduce $NO_x$ emissions, the particulate emissions tend to increase; similarly, as modifications are made to the engine to reduce the particulate emissions, $NO_x$ emissions increase. This interaction of $NO_x$ and particulate emissions makes the simultaneous control of both pollutants a difficult task requiring a fundamental change to the diesel combustion process.

This invention has achieved such change, resulting in an increase in mixing of the diffusion zone combustion products with air (to decrease the formation of particulates in the diffusion combustion zone) and to reduce the premixed combustion zone burning fraction thereby facilitating a reduction in the formation of $NO_x$. The change has been brought about by simultaneously (a) utilizing significantly higher fuel injection pressures than have been previously contemplated coupled with smaller nozzle ports to promote a distinctly novel fuel spray droplet pattern in the plumes for shortening the combustion period, and (b) limit the ingress of lubricating oil without affecting the durability of the engine. These factors have their best chance of changing the diesel combustion process when used in connection with high pressure charging of supply air for enhanced excess of oxygen to facilitate reduction of $NO_x$ in the premix combustion zone, fast rate of fuel/air mixing, and retarding ignition to promote a greater proportion of the combustion in the diffusion combustion zone. If a sufficiently high enough fuel injection pressure is utilized accompanied by a sufficiently high enough pressure charging of intake air, there will result a leaner air fuel ratio in both the premix and the diffusion combustion zones which has heretofore been considered difficult if not impossible to achieve by prior art technology.

Particulates are defined by the Environmental Protection Agency as any diesel exhaust affluent collected on a binderless glass fiber filter in a dilution tunnel at temperatures below 120° F. Hence, particulates will include not only solid carbon, but sulphate emissions and soluble organic fractions. The soluble organic fractions found in or on diesel particulates are comprised of unburned fuel, lubrication oil, and partially oxidized fuel and lubrication oil. Nitric oxides are generally defined to mean essentially NO, $NO_2$, and are generated by high temperature combustion.

The combustion cycle that takes place within a direct injected diesel engine involves essentially two local combustion zones, the first of which is identified as a premixed combustion zone or mode which consists of combustion of the fuel that was injected during the ignition delay period and was premixed with air prior to combustion. The local diffusion combustion zone or mode consists of the combustion of fuel at the fuel vapor/air interface of the injected fuel droplets. Each of these local combustion zones will have their own separate air/fuel ratio, even though no special resolution is inferred by the establishment of such separate combustion zones or modes. The air/fuel ratio of such local combustion zones will change as the gas properties in each zone change in proportion to the crank angle increment of the combustion cycle. The formation of $NO_x$ essentially occurs in the premix combustion zone primarily. The reason for this is the occurrence of high combustion temperatures in this regime. The formation of soot occurs primarily during the diffusion combustion mode, but the oxidation of such soot can occur during the mixing of air and diffusion zone combustion products.

The essential aspects of this invention provide for the simultaneous and concurrent in-cylinder control of the formation of particulates and nitric oxides during the combustion cycle of a direct-injected diesel fuel and pressure charged air in a combustion chamber of a heavy duty diesel engine. Working with such an engine having high pressure charged air and fast rate of fuel/air mixing, the method of control is then modified to have the steps of: (a) injecting diesel fuel with a pressure equal to or greater than $16 \times 10^3$ psi through injector ports having a diameter of less than 0.18 mm; (b) retarding the start of fuel ignition from TDC by 2°-5°; and (c) limiting ingress of lubricating oil into the combustion chamber by increasing the piston ring to cylinder bore concentricity through the use of noncompressed and nondistorted cylinder sleeves defining the cylinder bore.

It has been recognized by the prior art that turbocharging or supercharging of the air supply leads to a significant reduction in nitric oxide by itself. It has been found desirable with this invention that if such pressurized supply of air is 46 inches of mercury or greater, a synergistic combination effect can take place with the other control factors of this invention.

Figure 1:
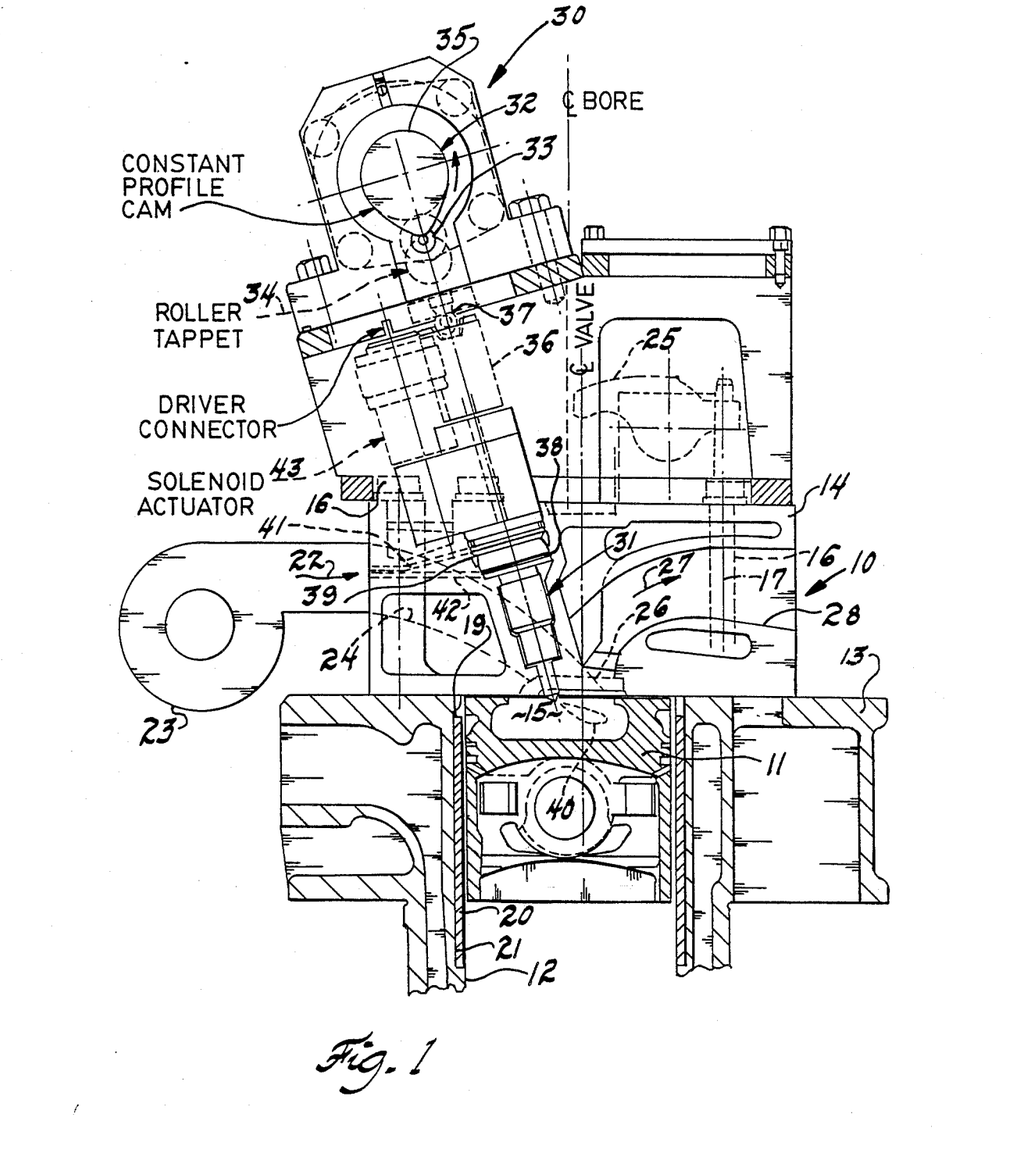
FIG. 1 is a schematic elevational view of a direct-injected diesel engine using high pressure unit injection of fuel and embodying the principles of this invention.

The environment for utilizing the principles of this invention is schematically shown in FIG. 1. Engine 10 has one or more pistons 11, each riding in a cylinder bore 12 of a cylinder block 13, which in combination with a cylinder head 14 defines one or more combustion chambers 15. The head 14 is coupled to the block 13 by compression bolts 16 extending along axes 17 placed inside the periphery 18 of the head and preferably adjacent the periphery of the bores 12. The cylinder bores are each defined substantially by insert sleeves 20 carried in a recess 21 of the wall of the cylinder bore. The recess provides freedom at its ends with respect to the sleeve so that the sleeve may be independent of the stresses applied by the bolts to the cylinder block.

Each combustion chamber 15 is supplied with high pressure air 22 from a turbocharger 23 that feeds the intake passage 24. A cam actuated rocker arm 25 operates valve 26 to control the ingress of charged air and, similarly, other cam actuated rocker arms operate exhaust valves that control the egress of exhaust gases 27 through exhaust ports 28.

One of the most important control factors of this invention is the use of significantly higher injection pressures for diesel fuel that has been contemplated by the prior art. This can be carried out by the use of unit fuel injectors, such as shown in FIG. 1. Each unit fuel injector 30 is stationed at the inlet to each combustion chamber 15 to raise a supply of low pressure fuel to significantly high pressures at the location where it is sprayed by nozzle 31 into the combustion chamber. The unit fuel injector has a cam assembly 32 that converts rotary motion to reciprocal piston motion by driving a roller 33 of a tappet 34 with a constant profile cam 35. The tappet in turn pushes a pressure piston 36 by way of a articulated joint 37 so that a working surface 38 at the opposite end of the piston 36 is effective to compress low pressure liquid fuel in a trapped chamber 39, which chamber is then placed in communication with the open nozzle 31 allowing high pressure fuel to be sprayed in plumes 40 of extremely fine particles of fuel. The chamber 39 is provided with a supply of fuel circulated from an inlet 41 to an outlet 42 via the chamber. The outlet 42 is closed during pressurization by a solenoid actuator 43.

Figure 2:
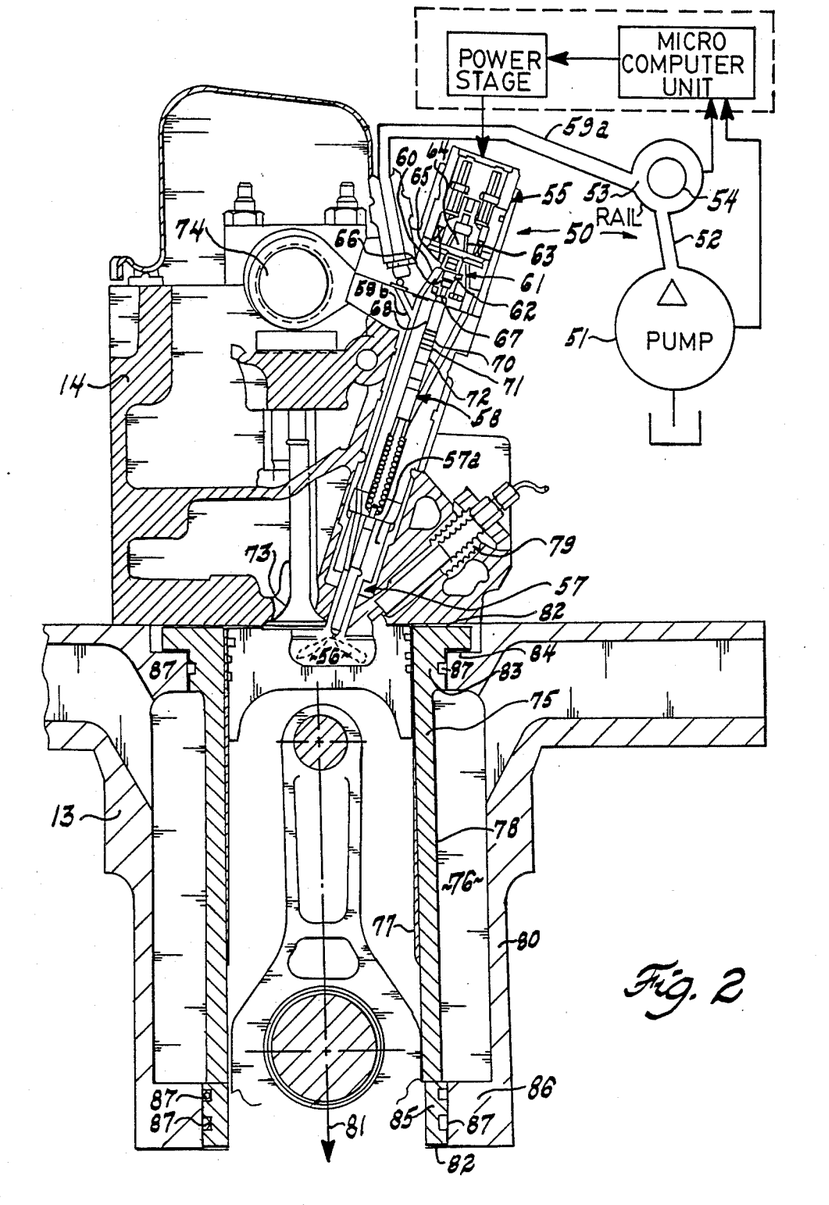
FIG. 2 is a view similar to FIG. 1, but showing an alternative construction using high pressure injection of fuel by a common rail system and wet sleeves to control bore concentricity.

Alternatively, the significantly higher injection pressures for diesel fuel may be effected by use of a common rail pressure supply 50. As shown in FIG. 2, a centralized, remote pump 51 is used to raise a low pressure fuel supply to the highest pressures needed for this invention. The output from the pump 51 is delivered via high pressure tubing 52 to a common rail line 53, such as a straight metal channel which also carries a pressure sensor 54 at one end. Injector assemblies 55 are placed adjacent each combustion chamber 56 to permit the deliver of such high pressure fuel from the common rail line 53 to the desired combustion chambers. The injector assemblies 55 each can be electronically controlled to provide for variation in the rate and pressure of fuel injection. Each injector assembly 55 is comprised of a nozzle assembly 57 and a pressure transducing assembly 58 to control the position of the nozzle slide 57a in the assembly 57.

Fluid from the common rail 53 is communicated through passages 59a and 59b (the latter being in parallel with the pressure transducing assembly 58 which controls the nozzle slide 57a for admitting or denying the spraying of high pressure fuel). The pressure transducing assembly 58 also receives high pressure fuel from the rail 53 through passage 60 and is passed into a valve unit 61 having an outer valve 62 (biased by spring 63) and an inner valve 64 biased by solenoid 65. Openings 66 in the outer valve 62 communicate high pressure fuel to a valve seat 67 that is controlled by valve face 68 on the end of the inner valve 64. High pressure fluid is admitted from such valve unit 61 through a one-way valve 70 biased by a spring 71 to position a hydraulic piston 72, which piston 72 is connected to the nozzle slide 57a for positioning of the latter.

In the engine construction of FIG. 2, wet cylinder sleeves 75 are utilized while still permitting freedom of the sleeve 75 to be independent of the bolt stresses applied to the block. Wet sleeves present walls that have an inner surface 77 exposed to combustion gases and an outer surface 78 exposed to a cooling medium 76 such as that contained in the water jacket 80 of the engine. The sleeves have some degree of freedom in an axial direction 81 of the bore, since a slight dimensional gap 82 exists at the upper and lower ends thereof. The upper end 83 of the sleeve is sealed against an annular shoulder 84 of the cylinder bore and lower end 85 is sealed against an annular shoulder 86 of such cylinder bore. Such sealing may be effected by O-rings 87 or other gasketing.

In this embodiment of FIG. 2, the intake and exhaust valves 73 are actuated by an overhead cam 74. A glow plug 79 may be employed to assist ignition.

If fuel injection pressures lower than $16 \times 10^3$ psi are utilized in combination with the other factors as required, the net result will be a limiting of the effectiveness of the invention strategy to control particulates. The upper limit of the amount of injection pressure that may be utilized is determined by cost and the ability to contain such increased pressures.

Figure 3:
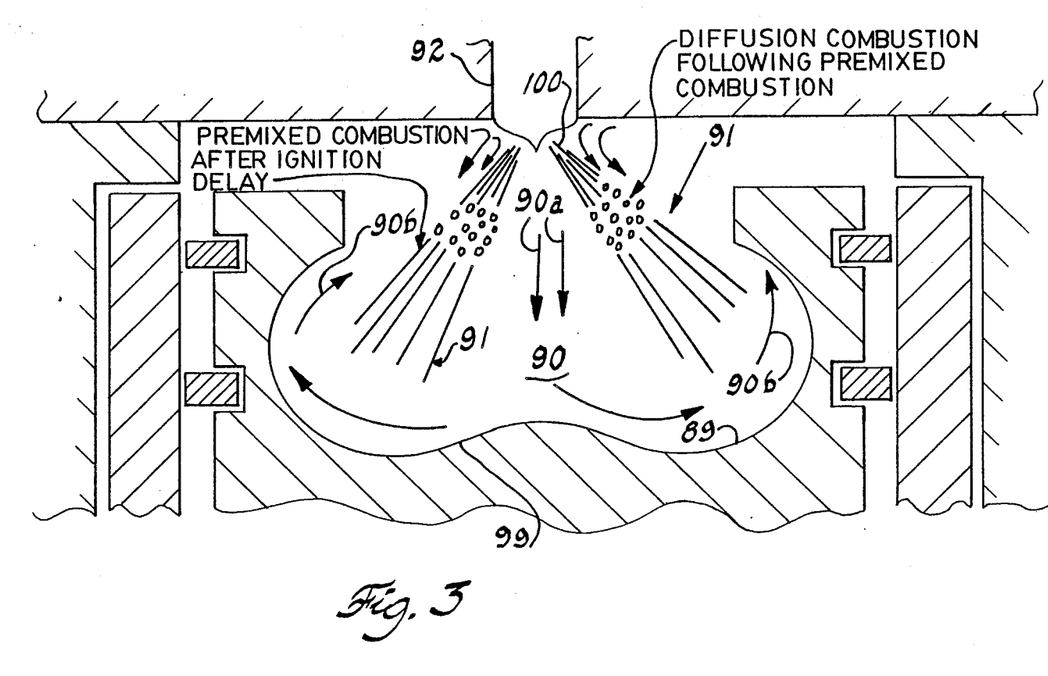
FIG. 3 is an enlarged schematic view of the internal combustion chamber of the engine of FIG. 1, illustrating the fuel injection spray plumes and further representing the premixed and diffusion local combustion zones.

As shown in FIG. 3, the use of small spray holes 100 in the tip 92 of the injector nozzle is essential to the use of high fuel injection pressures. The use of spray holes with diameters less than 0.22 mm (preferably lower than 0.18 mm) results in reduced particulate emissions while nitric oxide emissions are somewhat increased. The smaller spray holes produce smaller fuel droplets, thus providing a larger total droplet surface for interaction with the air supply. This may explain the somewhat increased nitric oxide formation and the particulate reduction. Smaller droplets tend to stay suspended in the air rather than impinge on a combustion chamber wall due o their higher air resistance relative to their mass. The use of smaller holes improves the particulate/nitric oxide trade-off because the reduction in particulates is significant. It has been found that the hole size particularly optimum for purposes of this invention is in the range of 0.14–22 mm.

Retarded ignition timing of 2°-5° from the top dead center crank angle is necessary to allow particulates to be slightly reduced in amount, while dropping the nitric oxide generation significantly from about 37-38 gm/kg of fuel down to about 28-32 gm/kg of fuel. As the start of combustion timing is retarded, the premixed combustion fraction increases due to the longer ignition delay encountered after top dead center. Although an increase in the premixed combustion fraction alone increases the nitric oxide emissions slightly, the late start of combustion timing reduces the peak combustion temperature level to provide an overall reduction in the nitric oxide emissions.

Certain accepted advanced combustion techniques are useful as a threshold level of technology to facilitate obtaining the results of this invention. The combustion techniques relate to introducing, distributing, and compressing the fuel and air, and particularly comprise: (a) the use of a reentraining bowl configuration in the crown of the piston; (b) use of air inlet designs to promote high swirl; and (c) a compression ratio greater than 20:1.

In the past, diesel engine piston crowns have generally been provided with straight-sided bowl configurations. In contradistinction, a reentraining bowl configuration, useful for this invention, has a non-straight side, cross-sectional configuration 99, such as that shown in FIG. 3. As the gaseous mixture enters the bowl interior 90, as forced by squish (the motion action imparted by the decreasing combustion chamber), the mixture will be given an angular motion such that it will move downward in the core flow 90a and curl backwards and upwards at its upper periphery 90b to reentrain the entering mixture. Rate of heat release measurements indicates that the use of the reentrant bowls begins to shorten the combustion period. This is considered to be due to the increased level of gas motion (higher tangential velocity level as well as turbulence in mixing rate potential) as has been shown by previous multidimensional fluid dynamics calculations as well as by combustion photography. The higher level of tangential velocity and a distinctly different pattern of air motion in the reentrant bowls is confirmed by others. The improved mixing conditions achieved as a result of the use of the reentrant bowl configuration is conducive to reducing black smoke and a decrease in insoluble particulates. It is assumed that the nozzle spray plume 91 from the fuel injector tip 92 is modified so that the spray pattern or plume is matched to the configuration of the reentrant bowl so that the fuel spray trajectory does not impinge upon the lips and side walls of the bowl. An advantage of matching the nozzle spray pattern to the reentrant bowl configuration is faster burning and a lower fuel consumption at retarded timing required for reducing $NO_x$ emissions in accordance with this invention.

Figure 4:
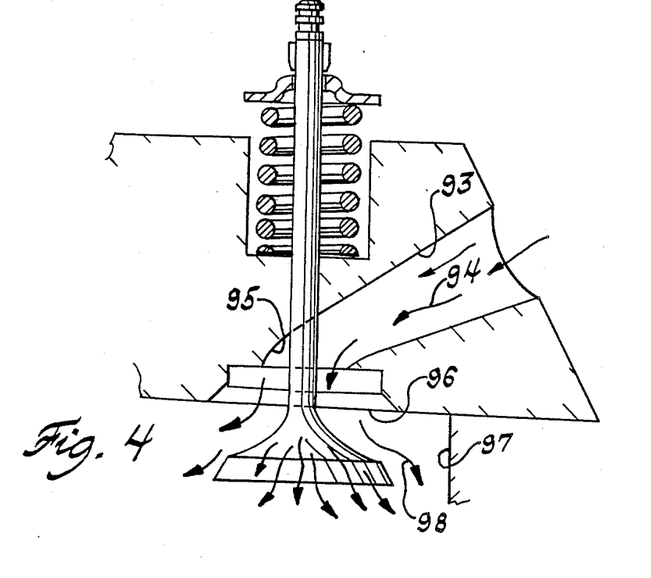
FIGS. 4 and 5 are schematic views, elevation and plan, respectively, of intake port and combustor geometry structure designed to promote high swirl mixing of the fuel and air.
Figure 5:
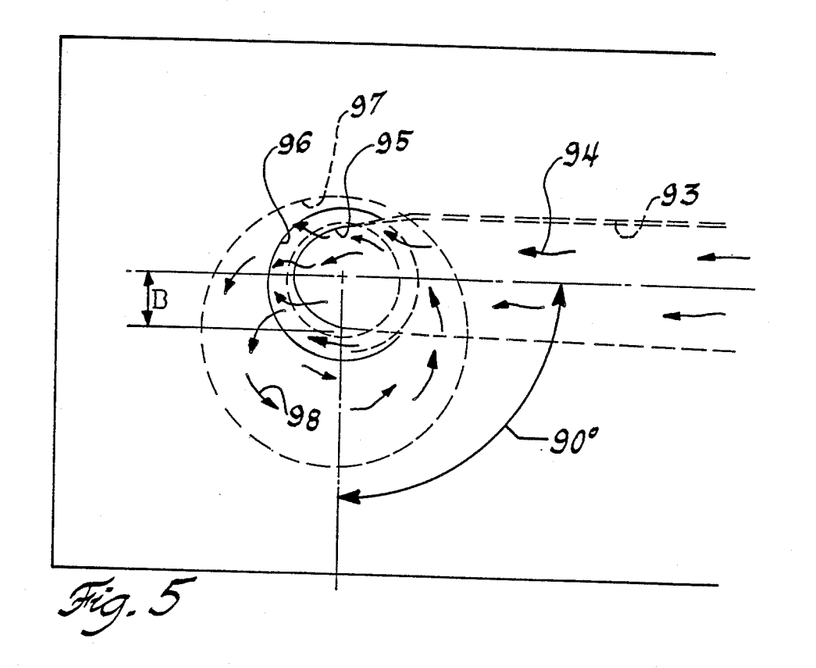

A second aspect of these techniques is the use of high swirl imparted by special location of the inlet port (see FIGS. 4 and 5) or by use of a blade in the intake passage to impart swirl effect. If by port location, as shown in FIGS. 4 and 5, the mixture will flow into the intake passage 93 with a strong component in the direction 94 of the passage walls as shown in FIG. 4a. As the passage walls 95 turn the flow through the intake valve seat 96, the flow is introduced at a side 97 of the cylinder bore so that it inherently causes a rotary swirling motion 98 which eventually becomes an active tumbling gas motion as the forces of squish are added to the swirl. The mixture is given a spiral directed along the circumference of the combustion chamber. In a combustion chamber which is relatively narrow and has a more or less concentrically located multihole injector, the swirl will be primarily responsible for an even distribution of diesel fuel within the combustion chamber.

A certain optimized swirl level is important to achieve acceptable levels of emissions with this invention. It has been found that this acceptable level is with a swirl ratio of about 2.0, but more preferably 1.6 to 2.8 for a noncentrally located bowl and less than 1.6 for a centrally located piston bowl. This permits a decrease in nitric oxide emissions without a substantial effect upon particulate emission levels. Swirl should be matched to the type of fuel injection because the two together affect air distribution and fuel impingement on the bowl wall, thus determining air utilization and overall swirl effects. Although others have found that lower levels of swirl below 2.0 have improved the reduction of nitric oxide, it has been found by this invention that increased swirl is particularly effective in conjunction with high fuel injection pressures and turbocharged pressures to reduce $NO_x$ and particulates.

Combining a high compression ratio, 18:1 or greater, with the reentraining combustion bowl configuration provides for low emissions. Particulates are decreased with increasing compression ratio, primarily due to the decrease of the fuel particulate fraction. Insoluble particulates will increase with higher compression ratios, but this is more than compensated for by the reduction of fuel particulates as a result of improved ignition conditions. With increased compression ratios, the fuel spray penetration is reduced and droplet size is optimized by being much finer. Nitric oxide emissions are practically not affected by compression ratio changes, but particulates are affected.

It is also recognized, as part of the advanced technology technique, that diesel fuel composition plays a role in the generation of particulates and nitric oxide. Such pollutants will be reduced if the fuel composition has reduced sulphur and aromatics leading to less sulphates on the particulates. It would be particularly desirable if the diesel fuel had considerably less than 0.3 weight percent sulphur (optimally 0.06 weight percent sulphur); similarly, instead of 36-37% aromatics, the fuel desirably should contain 10-15% aromatics. This reduction in fuel sulphur will significantly reduce particulates and permit the use of an oxidizing catalyst to further reduce the soluble particulates when used in conjunction with the invention which resists catalyst poisoning; this is a novel use of an oxidizing catalyst.

The amount of particulates that is due to the blow-by or ingress of lubricating oil into the combustion camber is primarily limited significantly by the use of noncompressed cylinder sleeves which define the cylinder bore. This improves the concentricity of the piston ring cylinder bore resulting in a smaller space or gap for the lubricating oil to migrate into the combustion chamber. This is important because use of excessively high tangential tension piston rings or sharper-edged piston rings leads to significantly bad wear characteristics for the engine and thus cannot be relied upon as a primary mechanism of reducing blow-by of lubricating oil.

To augment the use of the noncompressed cylinder sleeves which lead to increased concentricity, the cylinder sleeves should be machined and honed to increased specifications or tolerances, particularly in the range of 0.0005 inches concentricity. Limiting of ingress of lubricating oil can then be augmented by increasing the piston ring tension by 20-40% as permitted by the improved concentricity without affecting durability of the engine.

The lubricating oil may also be selected to have a viscosity increased by at least one weight, which viscosity cooperates with the higher degree of bore concentricity to limit lubricating oil ingress.

Figure 6:
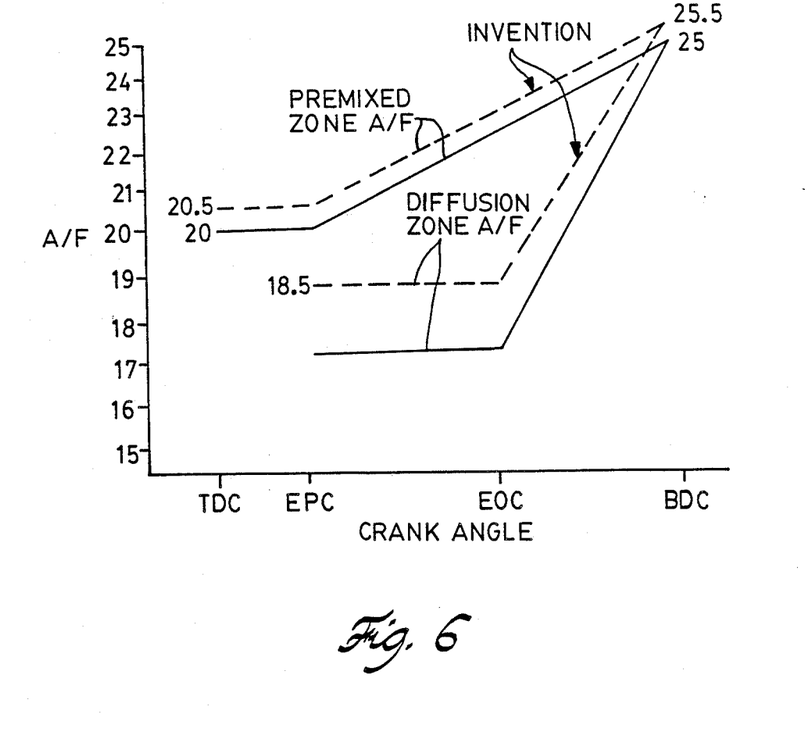
FIG. 6 is a graphical illustration representing air/fuel ratio as a function of crank angle for the local zones within the combustion chamber.
Figure 7:
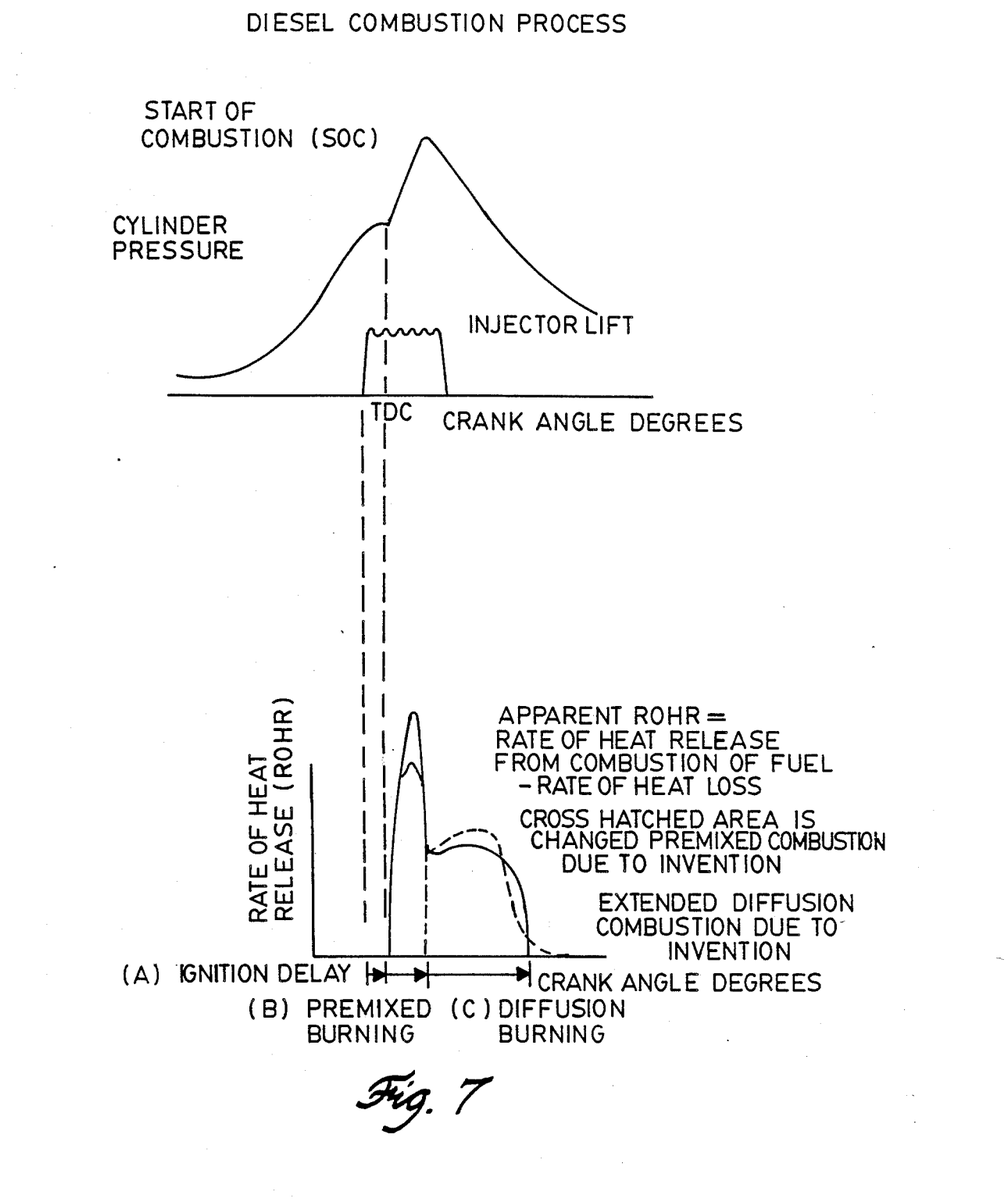
FIG. 7 is a composite graphical illustration of the diesel combustion process showing events of cylinder pressure, injector lift, and rate of heat release as a function of crank angle.
Figure 8A:
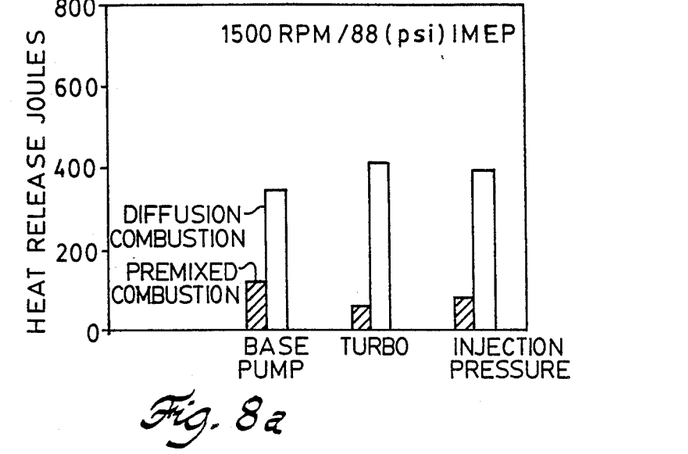
Figure 8B:
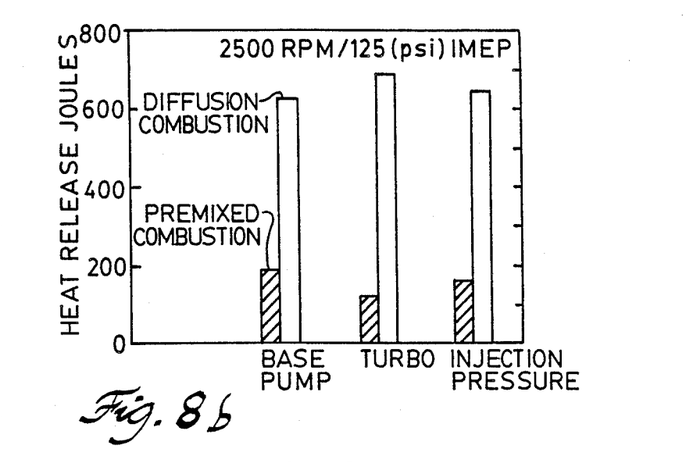

By simultaneously utilizing significantly higher fuel injection pressures through smaller fuel spray holes, retarded ignition, and increased bore-to-piston concentricity, the following technical effects have accrued:

the local air/fuel ratio in both the premix combustion zone and diffusion combustion zone have been increased (see FIG. 6);

the premix combustion fraction has been reduced slightly and the diffusion combustion fraction increased or extended (see FIGS. 7 and 8).

The synergistic and cumulative effects of turbocharging, very high fuel injection pressure, small nozzle ports, and controlled reduction in oil consumption, resulted in significant reductions in total exhaust particulates as well as $NO_x$. The amount of insolubles in the exhaust particulates are decreased significantly at full load and slightly at part loads. Increasing oxygen with turbocharging increases the oxidation of particulates during diffusion combustion and decreases the formation of $NO_x$ during premix combustion. High injection pressures improved fuel/air mixing, enhances burning, and shortens the combustion duration.

Figure 9:
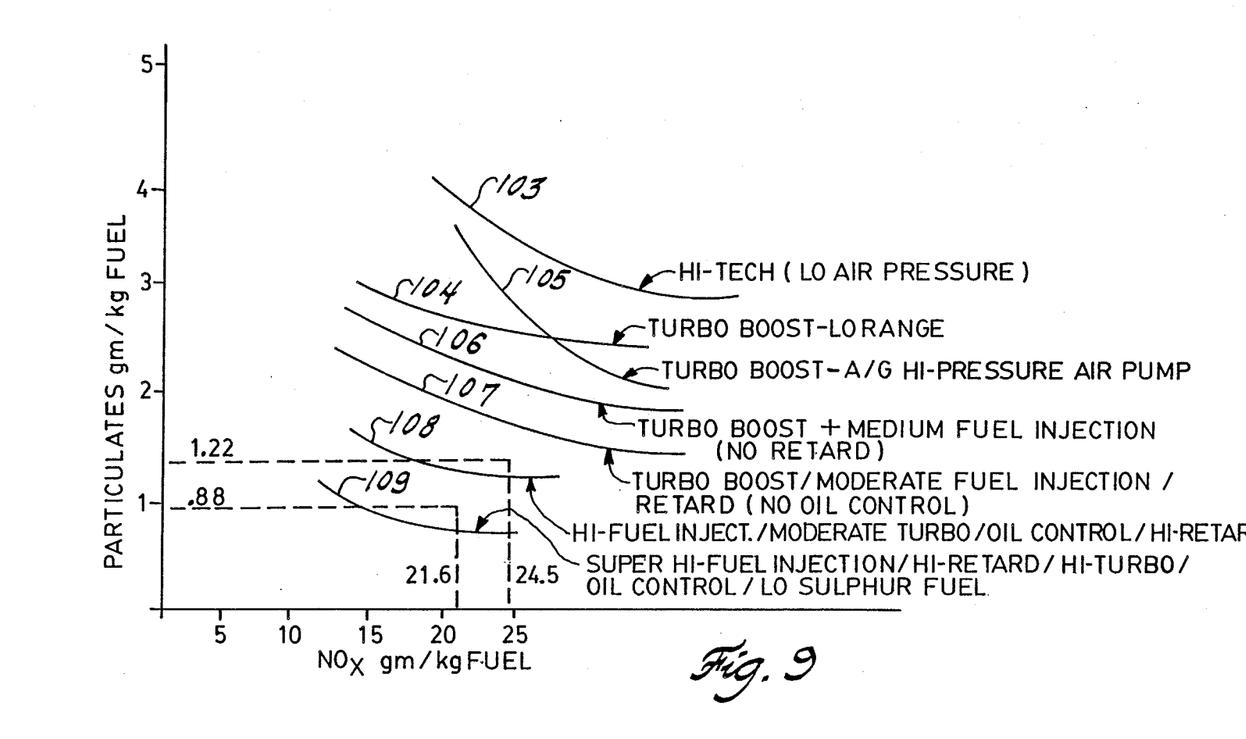
FIG. 9 is a graphical illustration of particulates emitted by such engine as a function of the nitric oxides emitted for various engines having different combination of the control factors.

Various combinations of combustion factors were evaluated in a direct-injected diesel engine and the trade-off $NO_x$ against particulates was plotted as shown in FIG. 9. The plots are as follows: 103 for an engine utilizing only advanced air/fuel mixing techniques; 104 for low range turbocharging and advanced air/fuel mixing techniques; 105 for higher turbocharging; 106 for an engine having high turbocharging and moderate fuel injection pressures; 107 for an engine with the same factors as 106, but in addition used ignition retardation; 108 for an engine utilizing the factors of 107 plus limitation on lubricating oil ingress; and 109 is for an engine using super-high fuel injection, high ignition retard of 4°, high turbocharging, limitation of oil ingress, and low sulphur fuel.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of the invention.

What is claimed:

1. A method of providing simultaneous and concurrent in-cylinder control of the formation of particulates and nitric oxide during the combustion cycle of direct-injected diesel fuel and pressure charged air in a combustion chamber of a heavy duty diesel engine, the combustion chamber being (i) defined in part by a piston crown separated by a supply of lubricating oil by piston rings and (ii) employing accepted advanced combustion techniques for introducing, distributing and compressing said fuel and air comprising the steps of:
   (a) injecting said diesel fuel at a pressure equal to or greater than $16 \times 10^3$ psi through injector ports having a diameter of less than 0.22 mm;
   (b) retarding the start of fuel injection from TDC by 2°–5°, and
   (c) limiting ingress of lubricating oil into said combustion chamber by increasing the piston ring to cylinder bore concentricity through the use of noncompressed cylinder sleeves defining said cylinder bore.

2. The method as in claim 1, in which said pressure charged air is turbocharged at pressures greater than 46 inches of mercury.

3. The method as in claim 1, in which said accepted advanced combustion techniques comprise:
   (a) use of a reentrant bowl configuration in the crown of said piston;
   (b) use of an inlet for said air to promote high swirl; and
   (c) a compression ratio greater than 18:1.

4. The method as in claim 3, in which said high swirl is characterized by a swirl ratio of about 2.0.

5. The method as in claim 3, in which said accepted advance combustion techniques further comprise use of low sulphur and low aromatic diesel fuel.

6. The method as in claim 1, in which said limiting of step (c) is further augmented by honing the mating diameters of said cylinder sleeves and pistons to be accurate within a tolerance of 0.0005 inches.

7. The method as in claim 1, in which said limiting of step (c) is further augmented by increasing the piston ring tangential tension.

8. The method as in claim 1, in which said limiting of said step (c) is further augmented by increasing the lubricating oil viscosity to be by at least one weight.

9. The method as in claim 1, in which said limiting of step (c) is further augmented by use of wet cylinder sleeves.

10. The method as in claim 4, in which said diesel fuel has a sulphur content less than 0.05 weight percent and an aromatic content of 11 weight percent or less.

11. The method as in claim 1, in which said injected pressure is achieved by use of a unit injector.

12. The method as in claim 1, in which said injector ports have a diameter in the range of 0.14–0.18 mm.

* * * * *